April 13, 1937. T. A. BOWERS 2,076,542
PISTON RING
Filed Sept. 7, 1935
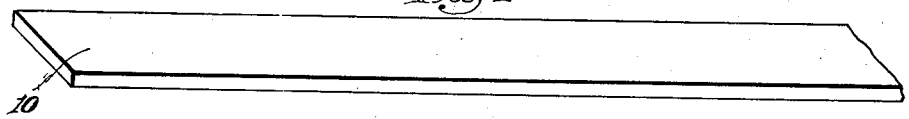
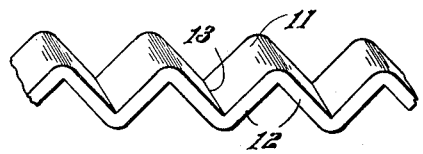
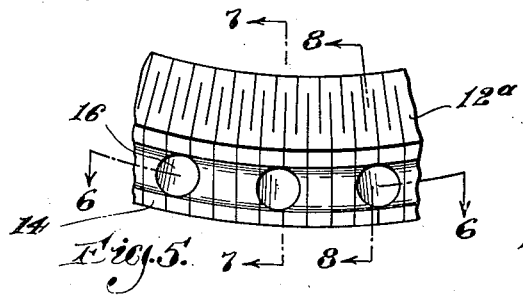
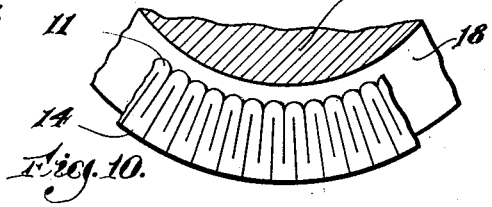
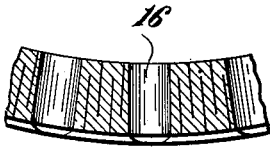
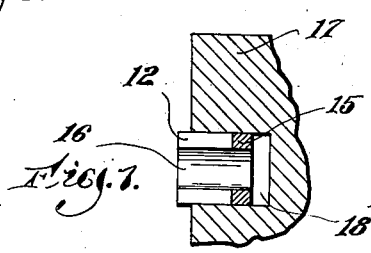
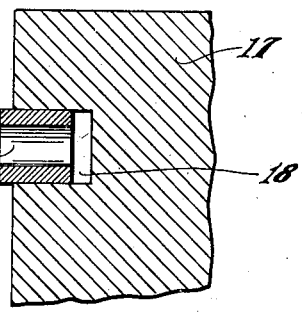
Inventor
Thomas A. Bowers
Munroe H. Hamilton
by Attorney Patented Apr. 13, 1937

2,076,542

UNITED STATES PATENT OFFICE 2,076,542

PISTON RING

Thomas A. Bowers, Boston, Mass., assignor to Flexion, Inc., Boston, Mass., a corporation of Massachusetts Application September 7, 1935, Serial No. 39,594

3 Claims. (Cl. 309—45)

My present invention relates to a piston ring material and more particularly to piston ring material formed from a reversely bent metal ribbon.

In a piston ring formed from a material of this character, it is possible to obtain greater flexibility, better sealing and greater resistance to wear, all of which characteristics are becoming more and more necessary to meet the requirements of recent developments in high speed and high compression motors. A more detailed discussion of the advantages inherent in a piston ring fabricated from such a reversely bent metal has been set forth in my earlier filed copending applications, Ser. Nos. 733,243 and 733,472, of which this application is a continuation in part.

In my improved piston ring material, I utilize the folds of metal ribbon turned at right angles to the position which they have assumed in all prior applications on such piston ring material, above identified. The material is forged with metal segments or flats appearing in two alternately disposed rows, such that all the flats along one side of the material will be smaller than those on the other side and the adjoining legs will become entirely keystone shaped. By the term "keystone", I wish to indicate a segmental structure having an outer face greater than its inner face. It should be understood that the so-called forged crowns, or flats, when turned at right angles as now taught, comprise the inner and outer periphery of a piston ring adapted to engage against, respectively, the piston groove and the cylinder wall. The edges of the legs, or webs, as I choose to term these portions, when in this right angle position, will comprise top and bottom land surfaces of a piston ring formed from an annularly compacted length of such a material. I make use of this material to form both compression and oil rings.

The principal object of my invention is therefore, a piston ring material formed from a reversely bent metal ribbon in which the bends are adapted to comprise inner and outer peripheries of a piston ring.

Another object is a piston ring formed from a reversely bent metal ribbon adapted to have provided therethrough, oil openings or grooves such that an oil ring may be effected.

Another object is a piston ring material of the character described, which is adapted to compact circularly and comprise a compression ring.

Still another object is a material of the character described, in which those portions comprising the outer periphery of the ring are formed with flat thick formations and those portions comprising the inner periphery of the rings are unchanged.

Other objects and novel features comprising the construction and operation of my invention will appear as the description of the same progresses.

In the drawing illustrating the preferred embodiment of my invention,

Fig. 1 illustrates a length of a metal ribbon used in the preparation of my improved piston ring.

Fig. 2 is a view showing the ribbon material reversely bent.

Fig. 3 is a side elevation of the material shown in Fig. 2, after the bends have been forged with alternately disposed flats, and being of two sizes.

Fig. 4 is a view showing in perspective, the material illustrated in Fig. 3, in which the variance in the proportions throughout, may be better seen.

Fig. 5 is a view showing in perspective, a section of a piston ring formed from the material illustrated in Fig. 4, after it has been turned at right angles and compacted.

Fig. 6 is a view illustrating a plan cross sectional view taken on the line 6—6 of Fig. 5.

Fig. 7 is a view illustrating a vertical cross sectional view taken on the line 7—7 of Fig. 5.

Fig. 8 is a view illustrating another vertical cross sectional view taken on the line 8—8 of Fig. 5.

Fig. 9 is a view similar to Fig. 3, showing in elevation a modification of my material.

Fig. 10 is a fragmentary plan cross sectional view taken through the groove of the piston ring and further illustrating the material set forth in Fig. 9, compacted into a piston ring and disposed in said groove.

Referring more in detail to the drawing, 10 indicates the metal ribbon which I utilize to form my piston ring material. In Figs. 2, 3, 4, and 5, I have illustrated various stages in the treatment of the metal ribbon 10, in which it is first reversely folded as shown in Fig. 2, with bends 11 and webs 12 and the insides of the bends are formed with sharp V edges 13, adapted to facilitate further bending and compacting. The material shown in Fig. 2, is passed through rotary dies not shown, which forge the bends of the material with flat rectangularly shaped portions and also effect a keystone or wedge shaped effect with respect to the webs 12. It will be noted further, that in this type of material, the alternately appearing flats 14, are formed with a greater dimension than the oppositely appearing flats 15 and the interjoining webs are symmetrically decreased in thickness from the point of junction with any flat 14, to the point of junction with a flat 15.

It may be readily seen that when the material illustrated in Fig. 4 is turned at right angles, it will, owing to this wedge shaped effect of the combined flats and webs, compact circularly, which is of a decided advantage in the manufacture of some types of rings from this metal ribbon material. When the ring material is turned to the position shown in Fig. 5, it will be apparent that the edges 12a of the webs and flats comprise top and bottom land surfaces and the flats 14 and 15 comprise respectively outer and inner peripheries of the completed ring.

As illustrative of one of the advantages derived from this new type of material, it is pointed out that provision for oil passages or grooves 16, is now possible in a fabricated material of this character and yet the fabricated structure is weakened only a very negligible amount, whereas any attempt to provide such oil grooves through the other dimension of the ring would necessarily to a considerable extent, cut through one or more of the webs 12, which would destroy the ring. By providing the thick forged flats 14 and 15, sufficiently strong inner and outer ring peripheries are obtained and the structure may be used as a straight compression ring or the oil grooves 16 may be cut through one or more of the flats in a horizontal manner so that only a very small amount of the total dimension of these flats and interjoining webs is affected. This may be better seen from examination of Fig. 6, and Fig. 7.

The result of the present fabricated material is to provide two new types of rings. The first being the compression ring in which certain advantages are present owing to the fact that the material will close circularly and comprise true radial preformed segments so that later, die forming, with undesirable thinning of the metal ribbon in effecting such wedge shaped structure, is eliminated. It has been found that one of the greatest weakening effects present when this ring material is in operation, comes from the constant flexing of the webs away from and towards one another. Such flexing will undesirably weaken the flats 14 and 15 unless certain proportions are adhered to. By maintaining the vertical distance from the V edge to the top of the flat greater than the thickness of the webs, flexing will occur in the webs and weakening of these flats is avoided, while at the same time a proportionately greater amount of metal is provided at the point of greatest wear.

Second, I have designed a very particular type of fabricated piston ring material which can be adapted advantageously to use as an oil ring by providing for oil grooves in such a fabricated material. Figs. 7 and 8 show the relation of these oil grooves with respect to the flats and webs and the grooves have been somewhat exaggerated for purposes of clarification.

In Figs. 9 and 10 I have illustrated still another modification of this right angle material so-called, in which only one set of flats have been forged with every inner alternate bend having been left unchanged and such a material may be adapted for use in particular types of piston ring where the inner periphery of the ring need not be a smoothly curved surface. In Fig. 10 I have illustrated a fragmentary plan cross section of a piston 17 provided with a groove 18, in which I have located this modified piston ring material.

It should be understood that I contemplate using various types of oil channels in such a piston ring material and the various changes in proportions and sizes may be resorted to.

Having thus described my invention, what I claim is:

1. A substantially solid and flexible packing ring formed from a single strip of reversely bent metal ribbon and having flattened crown portions and connecting web portions, said crowns occurring vertically of the ring to form inner and outer sides thereof, those crowns comprising the outer side of the ring individually having a greater dimension considered circumferentially of the ring than those crowns comprising the inner side of the ring, and the said ring having openings radially located therethrough adapted to comprise oil passages.

2. A substantially solid packing ring formed from a single strip of reversely bent metal ribbon and having crown portions and connecting web portions, said crowns occurring vertically of the ring to form inner and outer sides thereof, those crowns comprising the outer side of the ring individually having a greater dimension considered circumferentially of the ring than those crowns comprising the inner side of the ring, and the said crowns further having a radial thickness which is greater than the thickness of an adjacent related web portion considered circumferentially of the ring.

3. A substantially solid packing ring formed from a single strip of reversely bent metal ribbon and having crown portions and connecting web portions, said crowns occurring vertically of the ring to form inner and outer sides thereof, those crowns comprising the outer side of the ring individually having a greater dimension considered circumferentially of the ring than those crowns comprising the inner side of the ring, and the said crowns further having a radial thickness which is greater than the thickness of an adjacent related web portion considered circumferentially of the ring, and the said ring having openings radially located therethrough adapted to comprise oil passages.

THOMAS A. BOWERS.